United States Patent [19]

Hayashi

[11] Patent Number: 6,061,136
[45] Date of Patent: May 9, 2000

[54] METHOD FOR MEASURING SHAPE OF OBJECT AND APPARATUS FOR CARRYING OUT THE SAME

[75] Inventor: Shinichi Hayashi, Tokyo, Japan

[73] Assignee: Olympus Optical Co., Ltd., Tokyo, Japan

[21] Appl. No.: 08/967,938

[22] Filed: Nov. 12, 1997

[30] Foreign Application Priority Data

Nov. 13, 1996 [JP] Japan ..................................... 8-301476

[51] Int. Cl.[7] ...................................................... G01B 9/02
[52] U.S. Cl. .......................... 356/357; 356/359; 356/360
[58] Field of Search .................................... 356/359, 360, 356/357

[56] References Cited

U.S. PATENT DOCUMENTS 5,479,259  12/1995  Nakata et al. ........................... 356/349

FOREIGN PATENT DOCUMENTS 5232384  9/1993  Japan .

OTHER PUBLICATIONS

M. Totzeck, et al., "Phase–Singularities in 2D Diffraction Fields and Interference Microscopy," Optics Communications 138, Jun.1, 1997, pp. 365–382.

K. Creath, "Phase–Measurement Interferometry Techniques," E. Wolf, Progress in Optics XXVI Elsevier Science Publishers B.V., 1988, pp. 351–393.

D.M. Gale, et al., "Linnik Microscope Imaging of Integrated Circuit Structures," Applied Optics, vol. 35, no. 1, Jan. 1, 1996, pp. 131–148.

V.P. Tychinsky, "On Superresolution of Phase Objects," Optics Communications, vol. 74, no. 1,2, Dec. 1, 1989, pp. 41–45.

V.P. Tychinsky, et al. "Computerized Phase Microscope for Investigation of Submicron Structures," Optics Communications, vol. 74, no. 1,2, Dec. 1, 1989, pp. 37–40.

D. Malacara, "Optical Shop Testing," John Wiley and Sons, New York (1978).

*Primary Examiner*—Robert H. Kim
*Assistant Examiner*—Andrew H Lee
*Attorney, Agent, or Firm*—Stevens, Davis, Miller & Mosher, L.L.P.

[57] ABSTRACT

In a method of measuring or estimating the shape of an object under inspection in a very precise manner, an interference image is formed by composing an inspection light beam having information about the shape of the object under inspection and a reference light beam with an interferometer and an imaging optical means, phase singular points are detected from the interference image by processing an image signal produced by an image sensing element receiving the interference image, the position of a reference point of the object under inspection is measured, the relative positions of the detected phase singular points with respect to the position of the reference point are detected in a calculation unit, and the shape of the object is estimated by using the thus detected relative positions and a correlation between the relative positions and the shape of the object in the calculation unit. The correlation has been theoretically or experimentally derived and has been previously stored in the calculation unit.

13 Claims, 7 Drawing Sheets

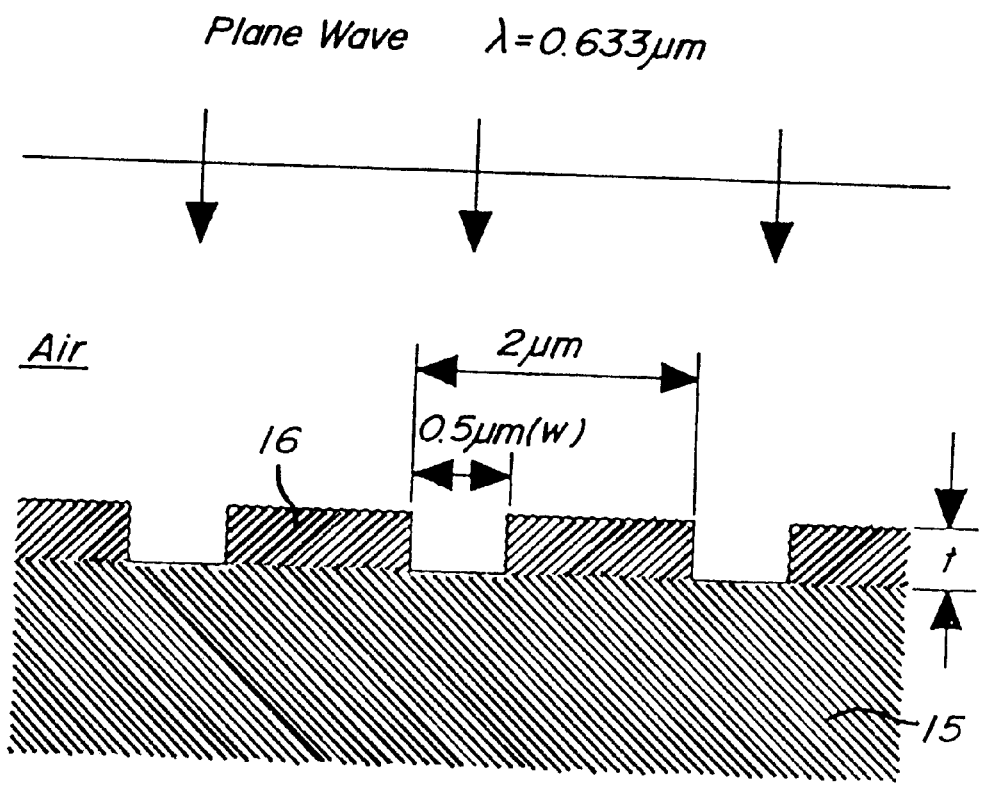

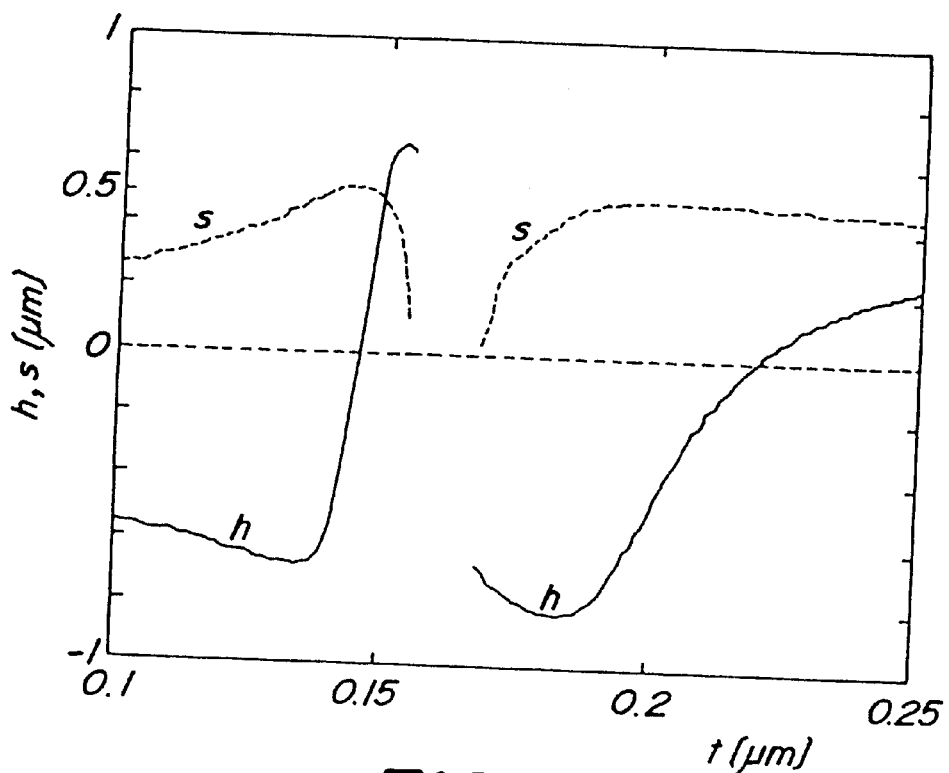
FIG_4A
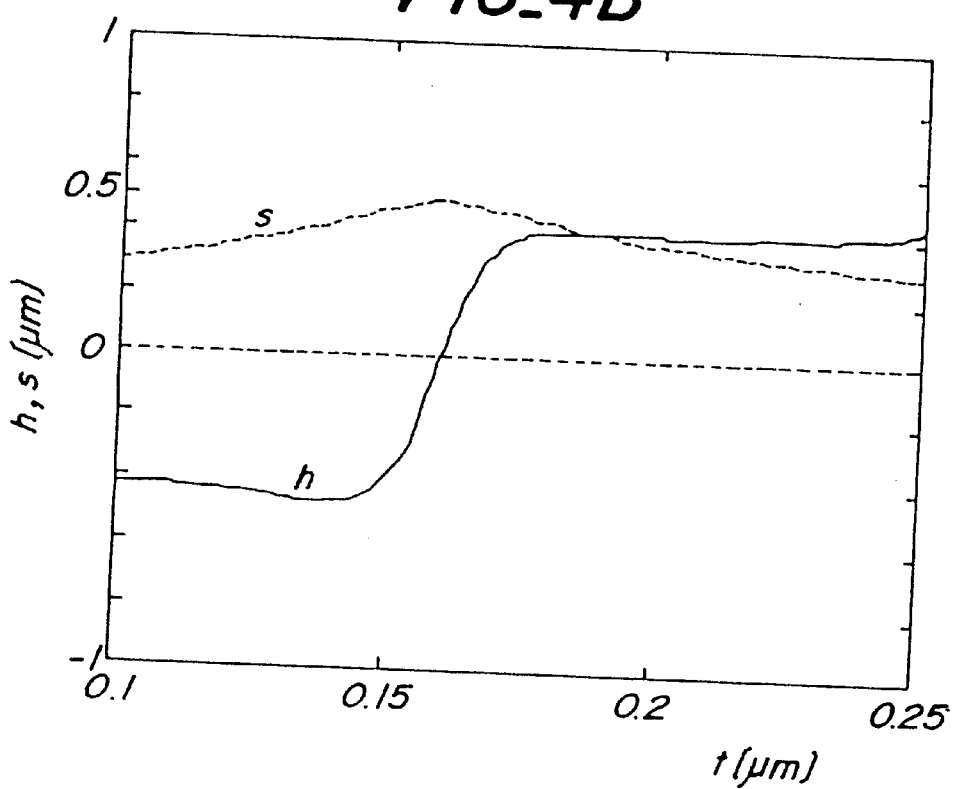
FIG_4B

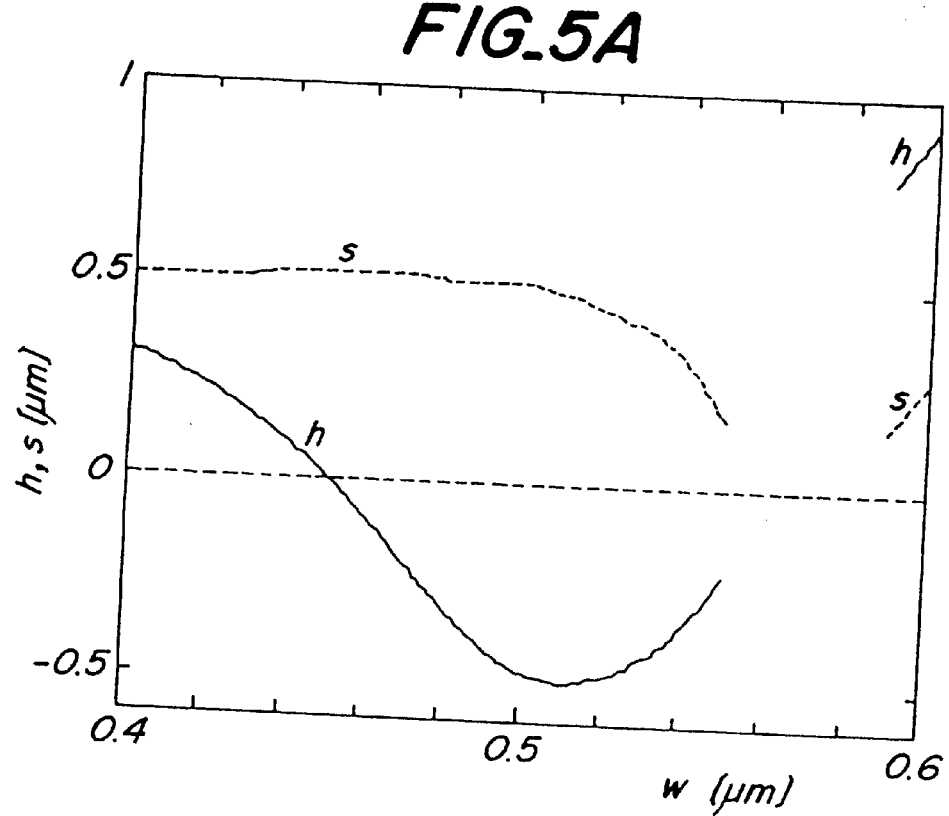
FIG_5A
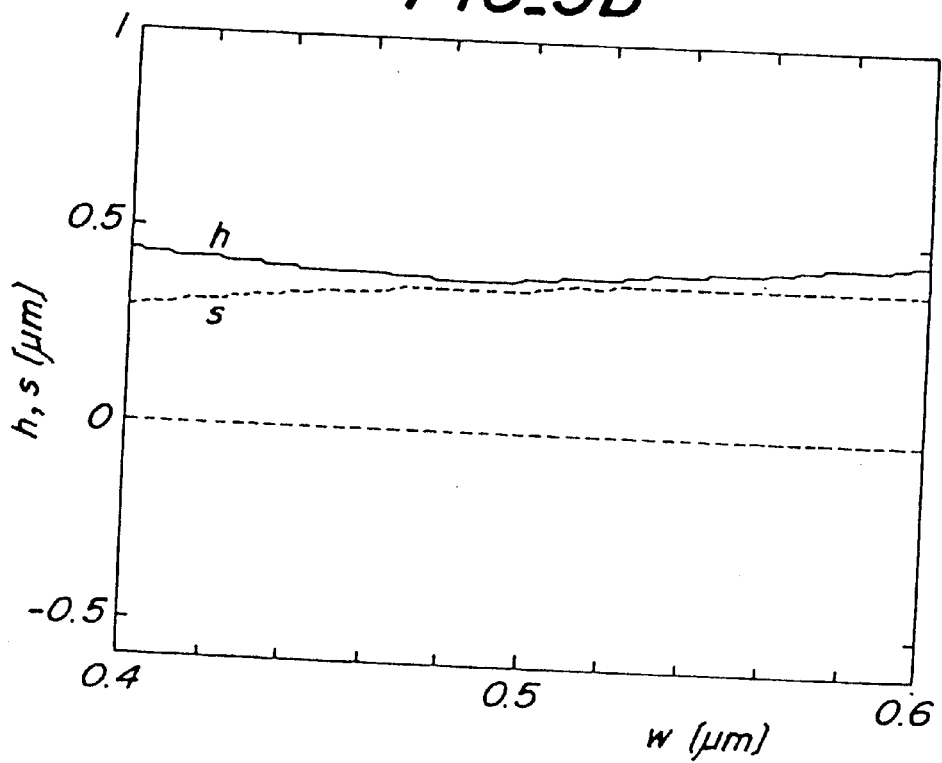
FIG_5B

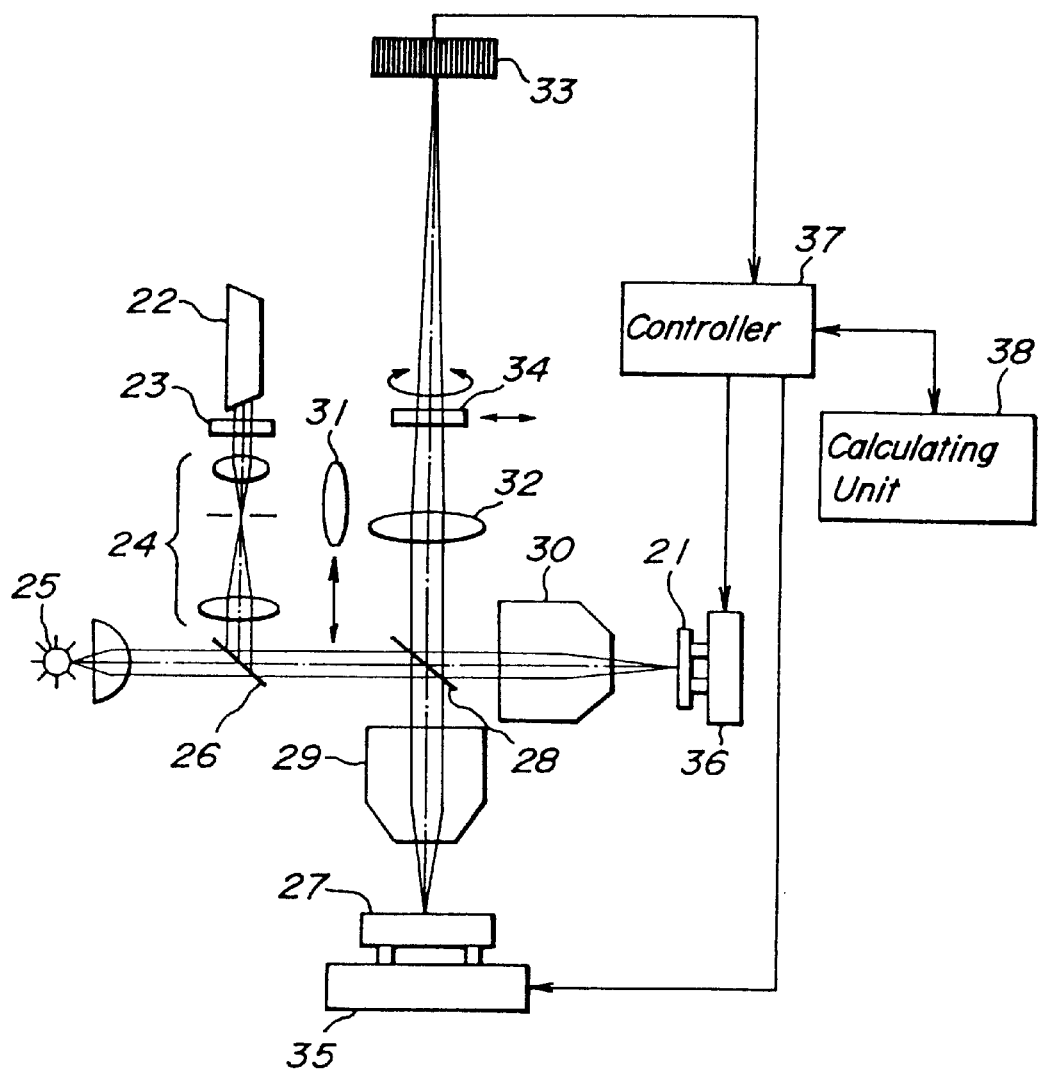
FIG_6

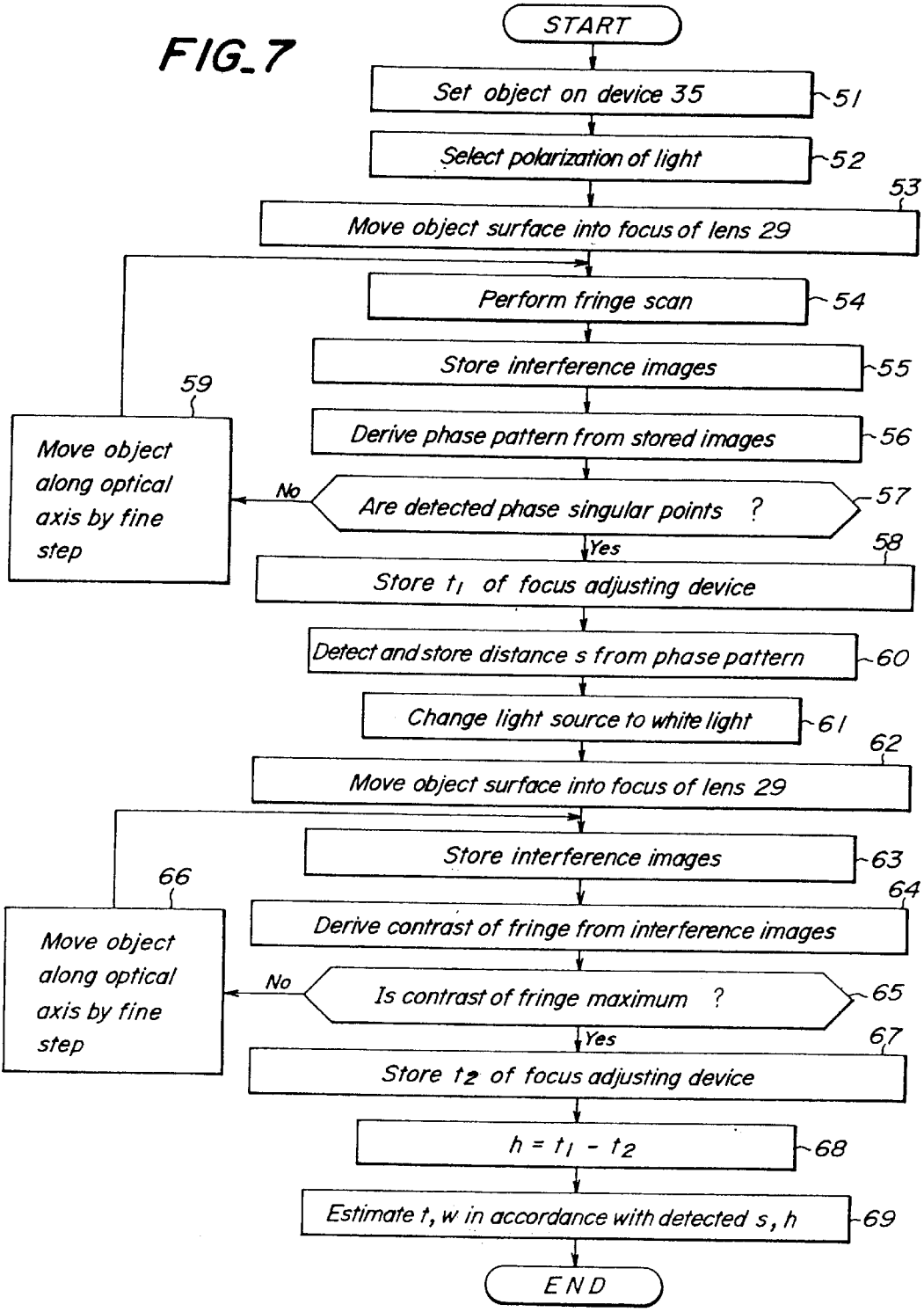

METHOD FOR MEASURING SHAPE OF OBJECT AND APPARATUS FOR CARRYING OUT THE SAME

BACKGROUND OF THE INVENTION

1. Field of the Invention

The present invention relates to a method of measuring and checking a shape of a fine object or an article by using an interference image between light having information about the shape of the object and reference light. The invention also relates to an apparatus for carrying out such a method.

2. Related Art Statement

Various types of apparatuses for measuring and checking a shape of objects utilizing an interferometer have been proposed. For instance, some known shape measuring apparatuses have been disclosed in D. Malacara, "Optical Shop Testing", John Wiley and Sons, New York (1978). Particularly, a phase measurement using the fringe scan has been widely used in measurements of a fine structure of an object, because depressions and protrusions of an object surface can be measured with a precision which is higher than a hundredth of a wavelength.

C. Bouwhius et al have reported in "Principles of Optical Disc Systems", Intern. Trens in Optic, Acad. Press (1991) that when an object surface has a step, diffracted light contains a phase jump (singular point) near the step. This singular point of a very small size is often generated not only at the step, but also in a close vicinity of a point at which optical property of an object under inspection is discontinuous. For instance, at a boundary of two different optical materials, a singular point occurs. Therefore, by measuring the position of a singular point with a high precision, an optical discontinuous point can be measured precisely.

V. P. Tychinsky has reported in "Computerized Phase Microscope for Investigation of Submicron Structure", Optics Communications, Vol. 74, (1989), pp. 37–40 that a phase measurement can observe a fine structure of a size smaller than the Rayleigh limit, which had been considered as the resolution limit. Recently, the size of IC patterns and thin film magnetic head gaps has been reduced more and more, so that it is difficult to observe these articles by conventional optical microscopes. The phase measuring technique has a possibility for providing a solution for such a problem.

FIG. 1 is a schematic view showing a known shape measuring device. This shape measuring device utilizes the Twyman-Green interferometer. A parallel coherent light beam emitted by a laser 1 is expanded by a beam expander 2. The expanded parallel laser beam is made incident upon an interference optical system 3 formed by a half mirror and is divided thereby into an inspection laser beam which is directed toward an object 4 under inspection along an inspection optical path 5 and a reference laser beam which is directed toward a reference body 6 along a reference optical path 7.

The inspection and reference laser beams are reflected by the object 4 and reference body 6, respectively and are made incident again upon the interference optical system 3 along the inspection and reference optical paths 5 and 7, respectively. At the interference optical system 3, these laser beams are composed with each other to produce a composite laser beam due to an interference. The composite laser beam is then made incident upon an objective lens 8 and an interference image of the object 4 and the reference body 6 is formed on an image sensing device 9. An image signal obtained by the image sensing device 9 is supplied to an image display device 11 via a controller 10 and the interference image is displayed thereon.

In the interference image displayed on the image display device 11, there are produced interference fringes in accordance with a local difference in an optical path length between the inspection optical path 5 and the reference optical path 7. Therefore, during a time when the reference body 6 is moved in the direction of the optical axis by driving a phase modulator 12 from the controller 10 to vary the difference in optical path length finely, a plurality of interference images are picked-up by the image sensing device 9. This operation is generally called the fringe scan. Then, a phase distribution in a vicinity of a surface of the object 4 can be calculated from the interference images. Methods of calculating the phase distribution from plural interference images obtained by using the fringe scan have been described in detail in Katherine Creath, ""PHASE-MEASUREMENT INTERFEROMETRY TECHNIQUES", Progress in Optics XXVI, Amsterdam 1988, pp. 351–393 and JP-A 5-232384. A shape of an object under inspection may be estimated by deriving one or more phase singular points in the phase distribution.

However, the known shape measuring apparatus using a phase singular point has the following problem. That is to say, in the known apparatus, only the lateral position of a phase singular point is detected and the position of an optical discontinuity on the surface of an object under inspection is estimated from the thus detected lateral position of the phase singular point. Therefore, if a recess-like microstructure is formed on an object surface, it is possible to measure the width of the recess, but the depth of the recess could not be measured.

As stated above, without knowing a correlation between the phase distribution of the electric field in a vicinity of the surface of an object under inspection and the shape of the surface of the object correctly, it is impossible to measure the shape of the object in an accurate manner. However, the known shape measuring apparatuses using an interferometer show a detected phase distribution as it is, which does not always give the correct shape of the object under inspection. For instance, in a detection of the lateral position of an optical discontinuity using a phase singular point, the detected lateral position of the phase singular point does not always coincide with the actual point of the optical discontinuity on the object surface, and thus a measured width of a recess formed on the object surface can be different from the actual value. Moreover, by the known shape measuring apparatuses, the depth of a recess formed on an object surface could not be measured at all.

SUMMARY OF THE INVENTION

The present invention has for its object to provide a novel and useful method of measuring a shape of an object under inspection using an interferometer, in which the shape of the object can be measured precisely.

It is another object of the invention to provide a shape measuring apparatus which can measure a shape of an object under inspection with high reproducibility and precision and has a simple construction.

According to the invention, a method of measuring a shape of an object under inspection comprises the steps:

composing a light beam having information about a shape of an object under inspection and a reference light beam each other to produce an interference image;

detecting one or more phase singular points observed in said interference image;

detecting the relative position between the phase singular point detected from the interference image and a predetermined reference point on the object under inspection; and estimating the shape of the object under inspection by performing a calculation on the basis of the relative position between the phase singular point and the reference point.

In the shape measuring method according to the invention, the relative position between one or more phase singular points and the reference point of the object under inspection is detected, and the shape of the object under inspection can be measured or estimated by performing the calculation on the basis of the detected relative position. That is to say, a correlation between the relative position and the actual shape of the object has been previously provided theoretically or experimentally, and the shape of the object can be estimated precisely in accordance with the thus obtained correlation.

In a preferable embodiment of the shape measuring method according to the invention, the interference image is formed by using two orthogonally polarized light components. Then, the position of a phase singular point can be detected for respective polarized light components, and therefore the shape of the object under inspection can be estimated much more precisely.

In another preferable embodiment of the shape measuring method according to the invention, the interference images are formed by using a plurality of light having different wavelengths and the position of a phase singular point is detected for respective interference images. Then, the shape of the object can be determined very accurately.

In another preferable embodiment of the shape measuring method according to the invention, the shape of the object under inspection is estimated by using predetermined shape parameters. Then, the calculation can be carried out simply. That is to say, correlations between the shape parameters and the relative position between the phase singular points and the reference points of the object are previously determined by calculation or experiences. Then, a shape parameter can be easily derived from the detected relative position between the phase singular points and the reference points. In this manner, the shape of the object under inspection can be measured very precisely.

In another preferable embodiment of the shape measuring method according to the invention, the shape parameter includes at least one of the width, the height and the refractive index of a structure formed on a surface of an object under inspection. When the shape parameter includes the width of the structure, the width of a line in the inspection of IC and a magnetic disc can be easily measured. When the shape parameter includes a height, it is possible to measure the thickness of a lead pattern in IC. When the shape pattern includes the refractive index, it is possible to measure the amount of impurity doped into a silicon substrate.

According to the invention, an apparatus for measuring a shape of an object under inspection comprises:

a light source means emitting illumination light;

an illuminating means for guiding the illumination light to an object under inspection and to a reference body;

an interference means for interferencing the light transmitted through or reflected by the object under inspection and the light transmitted through or reflected by the reference body;

an imaging optical system for forming an image of said interference on a given image forming plane;

an image sensing means arranged on said image forming plane for picking-up said image of the interference to produce an image signal;

a focus adjusting means for changing the focus of the imaging optical system with respect to the object under inspection;

a position detecting means for detecting the position of a reference point of the object under inspection;

a phase singular point detecting means for detecting the position of at least one phase singular point of an electric field by processing said image signal generated from the image sensing means; and a calculating means for deriving the shape of the object under inspection on the basis of the relative position between said position of the reference point detected by said position detecting means and said phase singular points detected by said singular point detecting means.

In the shape measuring apparatus according to the invention, the position of a phase singular point are detected while the focus of the image forming means with respect to an object under inspection is adjusted by the focus adjusting means. In the calculating means, the shape of the object under inspection can be estimated precisely by using a previously determined correlation between the shape of the object and the detected relative position of the phase singular point.

In a preferable embodiment of the shape measuring apparatus according to the invention, a polarization modulating means is arranged in the optical path of the image forming means to produce two orthogonally polarized light beams, and the first and second phase singular points are detected by using the two orthogonally polarized light beams, respectively. Then, the shape of the object can be estimated in accordance with the thus detected first and second phase singular points in an accurate manner.

In another preferable embodiment of the shape measuring apparatus according to the invention, the light source means generates a plurality of light beams having different wavelengths, and a plurality of phase singular points are detected for respective light beams. Then, a plurality of relative positions are derived in accordance with a plurality of phase singular points and the position of the reference point of the object under inspection. Then, the shape of the object under inspection can be estimated much more precisely in accordance with a plurality of the thus detected relative positions.

BRIEF DESCRIPTION OF THE DRAWINGS

FIG. 2 is a schematic view explaining the electric field analysis in a vicinity of the surface of an object under inspection;

FIGS. 4A and 4B are graphs depicting the correlation between the depth t of the recess formed on the object surface and the height h of phase singular points and the distance s between the phase singular points for P-polarized and S-polarized light beams, respectively;

FIGS. 5A and 5B are graphs showing the correlation between the width w of the recess and the height h and the distance s for P-polarized light and S-polarized light, respectively;

FIG. 6 is a schematic view illustrating an embodiment of a shape measuring apparatus according to the invention; and FIG. 7 is a flow chart explaining the operation of the shape measuring apparatus shown in FIG. 6.

DESCRIPTION OF THE PREFERRED EMBODIMENT

Figure 1:
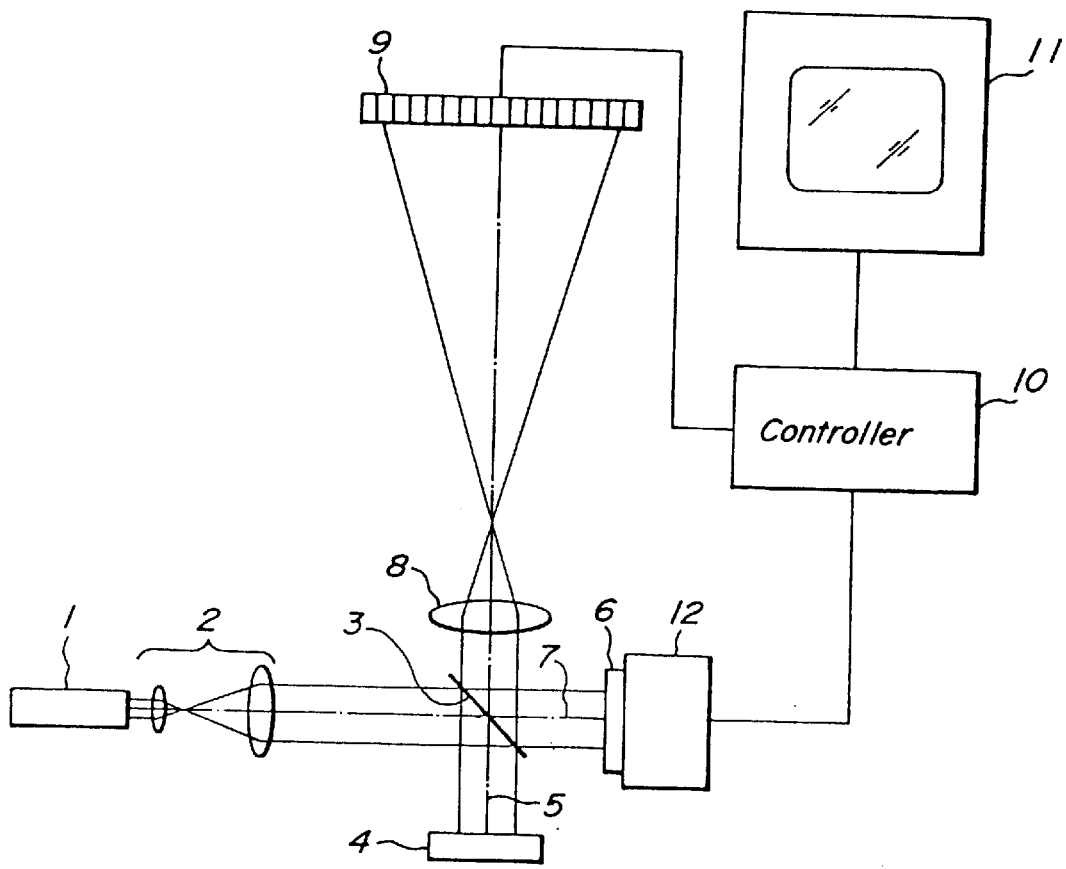
FIG. 1 is a schematic view showing a known shape measuring apparatus.

The inventor of the present application has conducted a detailed and deep analysis for the electric field generated in a vicinity of the surface of an object under inspection and has found that a phase singular point does not always occur on the surface of the object under inspection, but the height or level of the phase singular point is changed in accordance with the surface shape of the object under inspection. It has been further confirmed that when a phase singular point appears at a point which is spaced apart from the surface of an object under inspection, the lateral position of the singular point does not coincide with the lateral position of the optical discontinuous point of the object under inspection.

FIG. 2 is a schematic cross sectional view showing a model of an object under inspection (diffraction grating) used in the electric field analysis. In this model, on a silicon oxide ($SiO_2$) substrate 15 are formed silicon nitride films ($Si_3N_4$) 16 having a width of 1.5 $\mu$m and a thickness (t) of 0.2 $\mu$m, said films being arranged side by side with a pitch of 2 $\mu$m. Then, the width (w) of a gap between opposing edges of adjacent silicon nitride films 16 becomes 0.5 $\mu$m as shown in FIG. 2. Refractive indices n of the silicon oxide substrate 15 and silicon nitride film 16 are assumed to be 1.5 and 2, respectively. Upon the object, is made incident a plane wave having a wavelength $\lambda$ of 0.633 $\mu$m and an electric field which extends in a plane parallel with the grooves, i.e. a plane perpendicular to the plane of the drawing of FIG. 2 is analyzed.

Figure 3A:
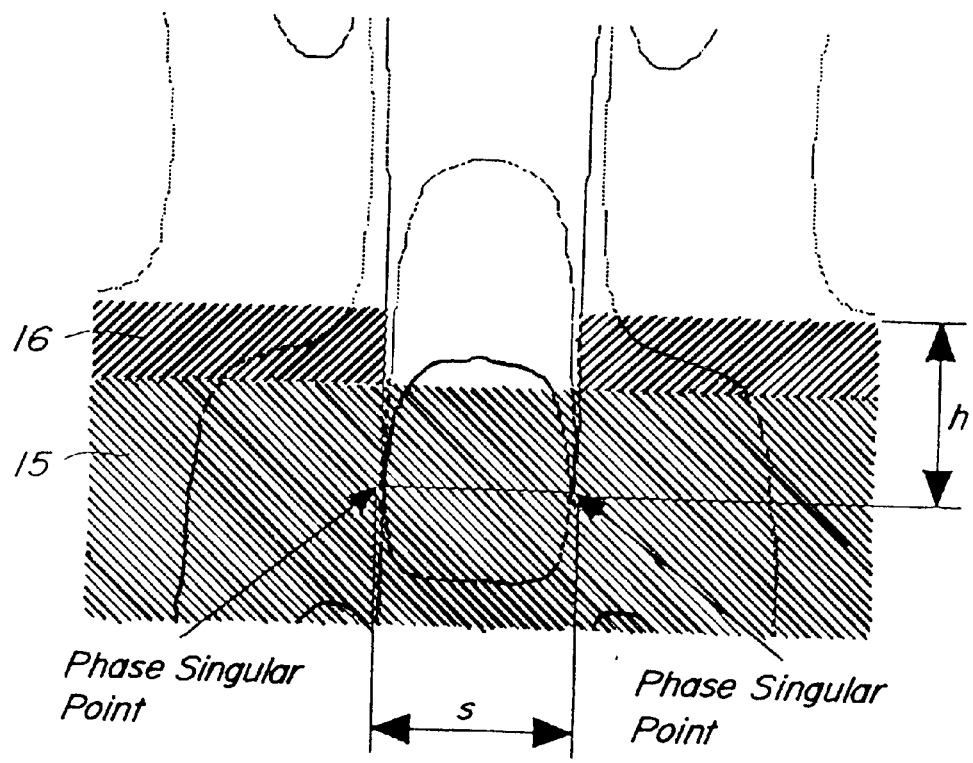
FIGS. 3A and 3B are schematic views representing phase distributions produced in a vicinity of the object surface for P-polarized and S-polarized light beams, respectively.
Figure 3B:
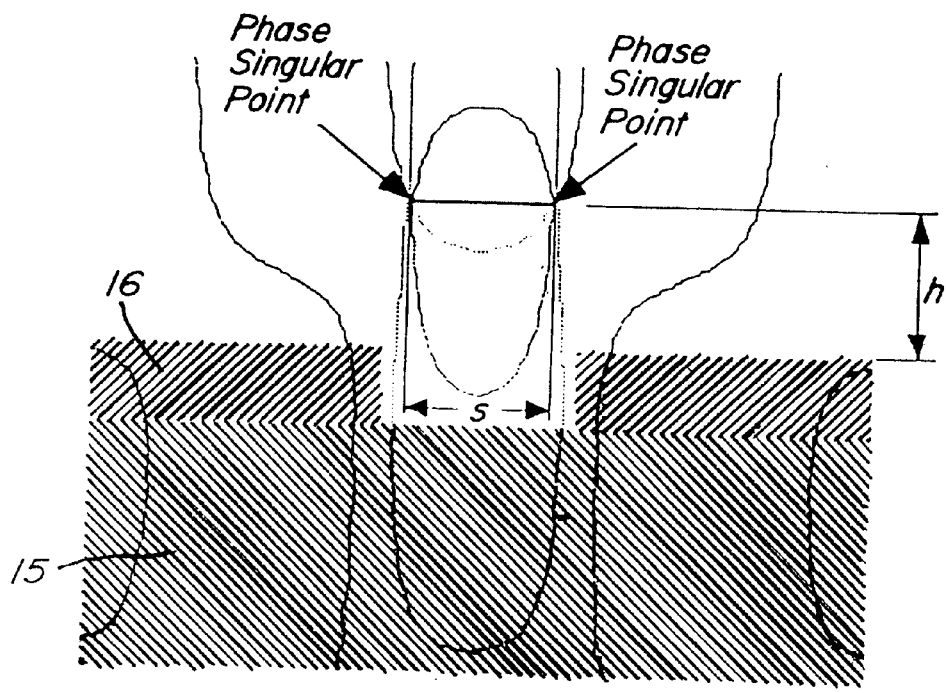

FIGS. 3A and 3B show a phase distribution of an apparent electric field which is produced in a vicinity of the surface of the object when the object is irradiated by P-polarized and S-polarized light respectively and viewed with an objective lens having a numerical aperture NA=0.9. The P-polarized light has the electric field component which is in parallel with the gratings formed on the object surface (perpendicular to the plane of the drawing of FIG. 2), and the S-polarized light has the electric field component which is at right angles to the P-polarized light (parallel with the plane of the drawing of FIG. 2). In this case, phase singular points due to the structure of the object are not produced on the object surface, but at different heights h with respect to the surface of the object. It should be further noted that the height of the phase singular point for the P-polarized light differs from that for the S-polarized light. Moreover, for the S-polarized light, the distance s between adjacent phase singular points does not coincide with the width w of the gap formed on the surface of the object.

FIG. 4A shows a correlation between the thickness t of the $Si_3N_4$ film 16 and the height h at which two singular points appear measured from a reference point of the object, i.e. the top surface of the $Si_3N_4$ film 16 and the distance s between adjacent phase singular points for the P-polarized light, and FIG. 4B illustrates a similar correlation for the S-polarized light. FIG. 5A depicts a correlation between the width w of the gap formed in the $Si_3N_4$ film 16 and the height h at which two singular points appear and the distance s between two phase singular points for the P-polarized light, and FIG. 5B represents a similar correlation for the S-polarized light.

As can be seen from FIGS. 4A, 4B, 5A and 5B, the height h at which two adjacent phase singular points appear and the distance s between these phase singular points are changed greatly in accordance with the thickness t of the $Si_3N_4$ film 16 and the width w of the gap formed in the $Si_3N_4$. Particularly, the distance s between adjacent phase singular points is not identical with the width w of the gap formed in the $Si_3N_4$ film 16.

The inventor has recognized the above fact and has found a recognition that the thickness t of $Si_3N_4$ film 16, i.e. the depth of the gap can be measured by detecting the height h and the distance s for S-polarized light. Particularly, in a range of the thickness t from 0.15 $\mu$m to 0.17 $\mu$m, the height h is changed substantially linearly in accordance with the thickness t for S-polarized light, and therefore the thickness t can be measured precisely only by detecting the height h for the S-polarized light. Similarly, in ranges of the thickness t from 0.135 $\mu$m to 0.15 $\mu$m and from 0.18 $\mu$m to 0.25 $\mu$m, the depth t can be measured accurately by detecting the height h only for the P-polarized light.

When not only the depth t of the recess but also the width w of the recess are unknown, the width w of the recess formed in the $Si_3N_4$ film 16 can be estimated by measuring the height h and the distance s of the phase singular points, while a correlation between the height h and the distance s for recesses having various widths have been previously derived as shown in FIGS. 5A and 5B. In this manner, a correlation between the height h and the distance s for predicted various thicknesses t and widths w has been derived by calculation (simulation) or experience, and the thus derived correlation is stored. Then the thickness t and the width w of the object under inspection can be estimated precisely by detecting a matching between actually measured values of the height h and the distance s and the previously derived and stored thicknesses t and widths w.

When the wavelength of light is changed, a correlation between the height h and the distance s of the phase singular points and the depth t and the width w of the recess is also changed. Therefore, a plurality of correlations between these parameters are previously determined for different wavelengths and are stored. Then, the shape of the object can be estimated much more precisely from the thus stored correlations and plural sets of the height h and the distance s which are obtained by using a plurality of light beams having different wavelengths.

FIG. 6 is a schematic view showing an embodiment of a shape measuring apparatus according to the invention. The shape measuring apparatus comprises a reference mirror 21 formed by a precisely manufactured plane mirror. The apparatus further comprises a laser light source 22 emitting a linearly polarized laser beam, a quarter wavelength plate 23 converting the linearly polarized laser beam into a circularly polarized laser beam, a beam expander 24 increasing the diameter of the laser beam into a desired diameter, a white light source 25 and a dichroic mirror 26 which combine the laser beam and the white light beam each other to form an illumination light beam. The shape measuring apparatus comprises a half mirror 28 which divides the illumination light beam into an inspection light beam and a reference light beam and combines the light beams reflected by an object 27 under inspection and the reference mirror 21 to produce an interference. Between the half mirror 28 and the object 27 there is arranged an inspection objective lens 29, and between the half mirror 28 and the reference mirror 21 there is provided a reference objective lens 30, a back focal point of which is conjugated with that of the inspection objective lens 29. A Köhler lens 31 is removably arranged in the optical path between the dichroic mirror 26 and the half mirror 28. When the Köhler lens 31 is inserted into the optical path, a back focal point of the Köhler lens substantially coincides with the pupils of the inspection objective lens 29 and the reference objective lens 30.

The shape measuring apparatus further comprises an image forming lens 32 which forms an image of the interference formed by the half mirror 28 at a predetermined image plane, and an image sensing element 33 having a light receiving surface arranged on said predetermined plane. The image sensing element 33 may be formed by CCD. In the optical path between the half mirror 28 and the image sensing element 33, there is arranged an analyzer 34 which constitutes a polarization modulating means. The analyzer 34 is arranged removably from the optical path and rotatably about the optical axis. The object 27 under inspection is placed on a focus adjusting device 35 including a piezo-electric element. By driving the focus adjusting device 35, a focus adjustment of the object 27 under inspection with respect to the inspection objective lens 29 can be carried out. The reference mirror 21 is provided on a retardation adjusting device 36 having a piezo-electric element, by means of which the retardation of the reference light can be adjusted. The focus adjusting device 35 and retardation adjusting device 36 are connected to a controller 37 to effect the above control. The image sensing element 33 is also connected to the controller 37 and an image signal supplied from the image sensing element is processed by the controller 37. The controller 37 is connected to a calculation unit 38.

Now the operation of the shape measuring apparatus shown in FIG. 6 will be explained with reference to a flow chart illustrated in FIG. 7.

At first, in a step 51, the object 27 under inspection is set on the focus adjusting device 35, and in a step 52, the analyzer 34 is operated to select the P-polarized light or S-polarized light under which phase singular points are to be detected. Next, in a step 53, the object 27 is moved to effect the focus adjustment such that the focus of the inspection objective lens 29 comes in a vicinity of the surface of the object 27. During this focus adjustment, analyzer 34 is removed from the optical path, the Köhler lens 31 is inserted into the optical path and the white light source 25 is ignited. Then, the white light beam is converged at the pupil of the inspection objective lens 29 by means of the dichroic mirror 26, the Köhler lens 31 and the half mirror 28. Therefore, the parallel illumination light beam is made incident upon the object 27 under inspection to illuminate a larger area of the object. In this case, the illumination light is also converged at the pupil of the reference objective lens 30, but is not made incident upon the reference mirror 21 by means of a shutter (not shown). Therefore, no reference illumination light is made incident upon the half mirror 28 from the reference mirror 21.

In the manner explained above, the object 27 under inspection is illuminated by the white illumination light from the white light source 25, and an image of the object 27 is formed on the light receiving plane of the image sensing element 33 by means of the inspection objective lens 29, the half mirror 28 and the image forming lens 32. An image signal supplied from the image sensing element 33 is processed by the controller 37 and a bright field image is displayed on an image display not shown. Then, a user adjusts the focus adjusting device 35 by means of the controller 37 to move the object 27 under inspection along the optical axis such that the focus of the inspection objective lens 29 comes in a vicinity of the object surface. It should be noted that this focus control may be carried out automatically by processing the image signal supplied from the image sensing element 33 via the controller 37 in the calculation unit 38 to derive a focus adjusting signal which is then supplied to the focus adjusting device 35 via the controller 37.

After the focus adjustment, the white light source 25 is extinguished and the analyzer 34 is inserted into the optical path. Further the Köhler lens 31 is removed from the optical path and the laser light source 22 is actuated to emit a laser beam. The linearly polarized laser beam is converted by the quarter wavelength plate 23 into a circularly polarized laser beam, which is then converted into a parallel laser beam having a large diameter by the beam expander 24. The parallel laser beam is reflected by the dichroic mirror 26 and is divided into two laser beams by the half mirror 28. One of the two laser beams is made incident upon the object 27 under inspection as a fine spot by the inspection objective lens 29 and the other laser beam is made incident upon the reference mirror 21 as a fine spot by means of the reference objective lens 30. In this case, the above mentioned shutter (not shown) is opened. The laser beams reflected by the object 27 under inspection and the reference mirror 21 are made incident upon the half mirror 28 by means of the objective lenses 29 and 30, respectively and are composed each other to form an interference. An image of the thus formed interference is projected onto the image sensing element 33 by means of the image forming lens 32 and the analyzer 34. In this manner, the image sensing element 33 receives a coherent interference image of the predetermined polarized light.

Then, in a step 54, the retardation adjusting device 36 is driven by the controller 37 and the reference mirror 21 is moved in a stepwise manner along the optical axis to perform a fringe scan. In a step 55, interference images obtained at respective steps in the fringe scan are stored in the calculation unit 38. Next, in a step 56, phase patterns are derived from the interference images obtained at respective steps of the fringe scan and stored in the calculation unit 38. In the next step 57, it is judged whether or not one or more phase singular points are detected in respective phase patterns.

When phase singular points are detected in the step 57, then in a step 58, position information t1 of the focus adjusting device 35 at this time is stored in the calculation unit 38 by means of the controller 37. When no phase singular point is detected in the step 57, the focus adjusting device 35 is driven by the controller 37 to move the object 27 under inspection along the optical axis by a small increment in a step 59, and after that the above mentioned steps 54–57 are repeated. In this manner, the object 27 is moved along the optical axis step by step until phase singular points are detected. It should be noted that when a plurality of light beams having different wavelengths are used, the above explained operation is performed repeatedly for the respective light beams. After that, in a step 60, the distance s between the detected and stored phase singular points is calculated in the calculation unit 38, and the thus calculated distance s is stored in the calculation unit.

Next, in a step 61, the laser light source 22 is extinguished or the laser beam is cut by the shutter not shown. At the same time, the white light source 25 is ignited. Then, an operation similar to that defined by the step 53 is conducted in a step 62 and the object 27 under inspection is moved along the optical axis such that the focus of the inspection objective lens 29 becomes in a vicinity of the object surface. Then, an incoherent interference is formed by composing, at the half mirror 28, the light beams reflected by the object 27 and reference mirror 21, respectively. An image of the incoherent interference is picked-up by the image sensing element 33. During this operation, the analyzer 34 is remained to be removed from the optical path.

Next, in a step 63, the output signal of the image sensing element 33 is stored in the calculation unit 38, and then in a step 64, a contrast of fringes of the stored incoherent interference image is detected. It should be noted that the incoherent interference image formed on the image sensing element 33 has a maximum contrast of fringes when the optical path length of the inspection light path is identical with the optical path length of the reference light path. In a step 65, it is judged whether or not the detected contrast of fringes of the incoherent interference image is maximum. When it is judged that the detected incoherent interference image does not have the maximum contract of interference fringes, in a step 66 similar to the step 59, the object 27 under inspection is moved along the optical axis by a small distance by driving the focus adjusting device 35, and then the steps 63–65 are repeated until the maximum contrast of interference fringes can be found.

When the detected contrast of the interference fringes is judged to be the maximum one, the inspection objective lens 29 can be focused precisely on a predetermined reference point of the object 27, e.g. the top surface of the object 27 under inspection. Then, in a step 67, position information t2 of the focus adjusting device 35 at this instant is stored in the calculation unit 38 by means of the controller 37.

In the manner explained above, the position information t1 and t2 have been detected and stored in the calculation unit 38. Then, in a step 68, the difference between these position information t1 and t2 is calculated to derive the relative position h of the phase singular points (h=t1−t2). Next, in a step 69, the shape parameters t and w are estimated on the basis of the distance s between the phase singular points obtained in the step 60 and the relative position h obtained in the step 68. That is to say, the correlation between the shape parameters t and w and the detected values s and h has been previously formed theoretically and experimentally and have been stored in the calculation unit 38. Then, the stored shape parameters t and w are retrieved by the detected values s and h to derive an optimum set of the shape parameters. It should be noted that the thus retrieved shape parameters t and w may be corrected by using an interpolation. The thus obtained shape parameters t and w are displayed on the display device not shown.

In the present embodiment, not only the distance s between the phase singular points but also the relative position between the phase singular points and the surface of the object 27 under inspection can be measured, and therefore the width w of the recess-like structure formed on the surface of the object 27 can be estimated much more precisely than the known shape measuring apparatuses and further the depth t of a recess-like structure which could not be detected by the known shape measuring apparatuses can be estimated accurately.

Furthermore, by rotating the analyzer 34, an interference image can be selectively obtained for either P-polarized light beam and S-polarized light beam. When both the P-polarized and S-polarized interference images are utilized, the shape of the object can be estimated much more accurately.

Further, when the Köhler lens 31 is inserted into the optical path, the illumination light can be converged at the pupil of the inspection objective lens 29 and thus a large area of the object 27 can be illuminated and monitored. Therefore, the focus adjustment in the steps 53 and 62 can be carried out easily and precisely.

The present invention is not limited to the embodiment explained above, but many alternations and modifications may be conceived by those skilled in the art within the scope of the invention. For instance, a reference position of the object under inspection may be determined at will such that the reference position can be observed easily. If an object has a relatively large flat surface area, this flat surface may be selected as a reference position. Moreover, a marker may be provided on the object surface and this marker may be used as a reference position.

Further, a reference position of the object under inspection may be detected by any other methods. For instance, a reference position may be detected by the heterodyne method using a laser light source emitting a plurality of wavelengths. A reference position may be directly detected by using a probe such as an atomic force microscope.

What is claimed is:

1. A method of measuring the shape of an object under inspection comprising the steps of:

(a) composing at least one light beam having information about a shape of an object under inspection and a reference light beam with each other to produce at least one interference image;

(b) detecting at least one phase singular point in said interference image;

(c) detecting the relative position of the phase singular point detected from the interference image with respect to a predetermined reference point of the object under inspection; and (d) estimating the shape of the object under inspection on the basis of the thus detected relative position of the phase singular point with respect to the reference point on the object under inspection.

2. A method according to claim 1, wherein the step of estimating the shape of the object under inspection includes a step of storing a correlation between shapes of the object and relative positions of the phase singular point with respect to the reference point on the object under inspection, and a step of estimating the shape of the object from said correlation in accordance with the detected relative position.

3. A method according to claim 1, wherein said at least one interference image comprises first and second interference images formed by using two orthogonally polarized light beams, respectively, said at least one phase singular point comprises first and second phase singular points detected form said first and second interference images, respectively, first and second relative positions of said first and second phase singular points detected from said first and second interference images with respect to said reference point are derived from said first and second phase singular points, respectively, and the shape of the object under inspection is estimated in accordance with said first and second relative positions, respectively.

4. A method according to claim 1, wherein said at least one light beam comprises a plurality of light beams having different wavelengths said at least one interference image comprises a plurality of interference images formed by using said plurality of light beams having different wavelengths, respectively, said at least one phase singular point comprises a plurality of phase singular points which are detected from said plurality of interference images, respectively, a plurality of relative positions are derived from said plurality of phase singular points, respectively, and a shape of the object under inspection is derived in accordance with said plurality of relative positions.

5. A method according to claim 1, wherein the shape of the object under inspection is estimated by using predetermined shape parameters.

6. A method according to claim 5, wherein the shape parameters include at least one of width, height and refractive index of a structure formed on a surface of the object under inspection.

7. A method according to claim 2, wherein said at least one interference image comprises first and second interference images formed by using two orthogonally polarized light beams, respectively, said at least one phase singular point comprises first and second phase singular points detected from said first and second interference images, respectively, first and second relative positions of said first and second phase singular points detected from said first and second interference images with respect to said reference point are derived from said first and second phase singular points, respectively, and the shape of the object under inspection is estimated in accordance with said first and second relative positions, respectively.

8. A method according to claim 2, wherein said at least one light beam comprises a plurality of light beams having different wavelengths, said at least one interference image comprises a plurality of interference images formed by using said plurality of light beams having different wavelengths, respectively, said at least one phase singular point comprises a plurality of phase singular points which are detected from said plurality of interference images, respectively a plurality of relative positions are derived from said plurality of phase singular points, respectively and a shape of the object under inspection is derived in accordance with said plurality of relative positions.

9. An apparatus for measuring the shape of an object under inspection comprising:

a light source means emitting illumination light;

an illuminating means for guiding the illumination light to an object under inspection and to a reference body;

an interference means for producing an interference between the light transmitted through or reflected by the object under inspection and the light transmitted through or reflected by the reference body;

an imaging optical system for forming an image of said interference on a given image forming plane;

an image sensing means arranged on said image forming plane for picking-up said image of the interference to produce an image signal;

a focus adjusting means for changing the focus of the imaging optical system with respect to the object under inspection;

a position detecting means for detecting the position of a reference point of the object under inspection;

a phase singular point detecting means for detecting a position of at least one phase singular point of an electric field by processing said image signal generated from the image sensing means; and a calculating means for deriving the shape of the object under inspection on the basis of the relative position between said position of the reference point detected by said position detecting means and said at least one phase singular point detected by said singular point detecting means.

10. An apparatus according to claim 9, wherein a polarization modulating means is arranged in the optical path of the image forming means to produce two orthogonally polarized light beams, and phase singular points are detected for respective one of the two orthogonally polarized light beams.

11. An apparatus according to claim 9, wherein the light source means generates light beams having different wavelengths, and phase singular points are detected for respective one of said light beams.

12. An apparatus according to claim 9, wherein said position detecting means includes a white light source emitting white light, and the position of the reference point of the object under inspection is detected by processing an image signal which is generated from said image sensing means when an incoherent interference image is produced by said white light and is received by said image sensing means.

13. An apparatus according to claim 9, further comprising means for storing a correlation between possible shapes of the object under inspection and relative positions of the phase singular point with respect to the reference point on the object under inspection and wherein said calculating means derives the shape of the object under consideration from said correlation in accordance with the detected relative position.

* * * * *